(12) United States Patent
Beech et al.

(10) Patent No.: US 8,777,089 B2
(45) Date of Patent: Jul. 15, 2014

(54) PROCESS CONTROL METHOD

(75) Inventors: Stephen M. Beech, Derby (GB);
Michael D. Rowlson, Hexham (GB);
Simon E. Bray, Derby (GB); Gavin J. Baxter, Sheffield (GB); Amar M. Varia, Leicester (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/175,294

(22) Filed: Jul. 1, 2011

(65) Prior Publication Data

US 2012/0012643 A1    Jan. 19, 2012

(30) Foreign Application Priority Data

Jul. 14, 2010 (GB) .................................. 1011833.9

(51) Int. Cl.
*B23K 20/12* (2006.01)
*B29C 65/00* (2006.01)
*B29C 65/06* (2006.01)
*B23K 20/22* (2006.01)

(52) U.S. Cl.
CPC ............... *B23K 20/121* (2013.01); *B29C 66/90* (2013.01); *B23K 20/1245* (2013.01); *B23K 20/127* (2013.01); *B29C 65/0672* (2013.01); *B29C 66/94* (2013.01); *B29C 66/92* (2013.01); *B23K 20/12* (2013.01); *B23K 20/22* (2013.01); *B29C 66/93* (2013.01); *B23K 20/123* (2013.01); *B23K 20/1285* (2013.01)
USPC ........... 228/112.1; 228/113; 228/114; 228/2.1

(58) Field of Classification Search
CPC .. B23K 20/121; B23K 20/1245; B23K 20/12; B23K 20/123; B23K 20/22; B23K 20/127; B23K 20/1285; B23K 2201/04; B29C 65/0672; B29C 66/90; B29C 66/92; B29C 66/93; B29C 66/94; G05B 2219/43074; G05B 2219/45146; G05B 2219/50235
USPC ................................ 228/112.1, 113, 114, 2.1
See application file for complete search history.

(56) References Cited

U.S. PATENT DOCUMENTS

| | | | |
|---|---|---|---|
| 4,746,051 A | | 5/1988 | Peter |
| 4,757,932 A | * | 7/1988 | Benn et al. ..................... 228/2.3 |
| 5,858,142 A | * | 1/1999 | Tully et al. .................... 156/73.5 |

(Continued)

FOREIGN PATENT DOCUMENTS

| | | |
|---|---|---|
| EP | 1 634 671 A2 | 3/2006 |
| GB | 2 137 774 A | 10/1984 |

OTHER PUBLICATIONS

Search Report issued in British Application No. GB1011833.9 dated Jul. 28, 2010.

(Continued)

*Primary Examiner* — Erin Saad
(74) *Attorney, Agent, or Firm* — Oliff PLC

(57) ABSTRACT

A method is disclosed for controlling a process in which a component 4 is moved relative to another component 6 such that at least one of the components 4, 6 experiences a reduction in magnitude in at least one dimension. Such processes may include for example friction welding. The method comprises monitoring energy input to the process and adjusting an input parameter for the process based on the monitored energy input. The monitoring of energy input is performed before any reduction in component magnitude has begun to take place.

12 Claims, 4 Drawing Sheets

(56) References Cited

U.S. PATENT DOCUMENTS

| | | |
|---|---|---|
| 6,021,938 A | 2/2000 | Boeck et al. |
| 2006/0037993 A1* | 2/2006 | Kyriakoglou .................. 228/113 |
| 2006/0043155 A1* | 3/2006 | Lovin et al. .................... 228/102 |
| 2006/0196916 A1* | 9/2006 | Goldstein et al. ........... 228/114.5 |
| 2008/0243290 A1 | 10/2008 | Badarinarayan et al. |

OTHER PUBLICATIONS

European Search Report issued Jan. 11, 2013 in European Patent Application No. EP 11 17 2331.

* cited by examiner

PROCESS CONTROL METHOD

The present invention relates to a method of controlling a friction welding process in which a component is moved relative to another component, such that at least one of the components experiences a reduction in magnitude in at least one dimension.

BACKGROUND

Inertia welding is a known process for joining two metallic components. During an inertia welding process, a first component is mounted for rotation coaxially with a flywheel which is driven up to a predetermined rotational speed. Rotary drive is then removed from the flywheel and the rotating first component is brought into contact with a static second component. Pressure is applied to force the two components together. Energy stored in the flywheel continues to cause rotation of the first component and the resulting friction between the components generates heat. The heat generated is sufficient both to soften the interface between the components and to assist the applied pressure in achieving a solid phase weld.

During the inertia welding process material is displaced, or upset, resulting in a shortening of the overall length of the two components. The total amount by which the length of the two components is reduced is termed the "upset length". Achieving an upset length within tight tolerances is important in many industries, including the aerospace industry, and it is known to control a friction welding process in an effort to achieve a desired upset length.

Existing methods of upset control compare the real time weld upset curve (graph of upset length against time) with the "ideal" target upset curve. As variations from the ideal curve are detected, either the weld forge pressure, or the rotational speed of the flywheel, is modulated accordingly. Such existing methods are necessarily reactive, only capable of reacting to weld data relatively late in the formation of the weld, once upset has already begun to take place. Considerable variation of upset length can still occur, as illustrated for example in FIG. 1, and there is therefore a need for an improved method of controlling upset.

SUMMARY OF INVENTION

According to the present invention, there is provided a method of controlling a friction welding process in which a component is moved relative to another component as the components are joined, such that at least one of the components experiences a reduction in magnitude in at least one dimension, the method comprising: monitoring energy input to the process and adjusting an input parameter for the process based on the monitored energy input, wherein the monitoring of energy input is performed before any reduction in component magnitude has begun to take place. The energy input to the process includes the energy per unit area of the friction welding apparatus for performing a friction welding process.

The present invention thus takes advantage of the physical processes underlying the process that is being monitored. The invention recognises the importance of variations in initial energy input, energy that is input to the process before any reduction in component magnitude has begun to take place. By reacting to this initial monitored energy input, the method exercises control from the very outset of the process. In so doing, the method of the present invention allows a greater level of control to be exercised over the process, providing both a more consistent reduction in component magnitude and lower level of parameter variation during the process.

The adjusting of an input parameter may also be performed before any reduction in component magnitude has begun to take place.

Monitoring energy input may comprise taking discrete measurements over a predetermined period of time. Alternatively, monitoring energy input may comprise taking a single measurement at a predetermined time. By carefully selecting the predetermined time, efficiency of effort can be achieved, providing the necessary data to adjust an input parameter from a single measurement. Similarly, economies of effort in parameter adjustment can be achieved, avoiding the necessity for continual input parameter adjustment.

The predetermined time may be half the time taken for reduction in component magnitude to commence. For example, in an inertia welding process, the predetermined time may be 50% of conditioning time. By monitoring energy input to the process at such an early stage, the present invention takes advantage of the understanding that initial energy input can be closely correlated to eventual variation in reduction in component magnitude.

Monitoring energy input may comprise measuring energy input and comparing measured energy input to a predetermined target value. Monitoring energy input may also comprise calculating a difference between the measured value and the target value.

The predetermined target value may be determined from a look up table. The look up table may be populated with data determined empirically.

Adjusting an input parameter may comprise determining a desired adjustment from a look up table correlating measured energy input values with corresponding input parameter values. The look up table may be populated with empirically determined data.

The reduction in component magnitude may comprise upset.

The input parameter may comprise at least one of rotational speed and input pressure.

According to another aspect of the present invention, there is provided a process for friction welding comprising: mounting first and second components for relative motion, imparting rotary motion to the first component, applying a force to bring the first and second components into contact, determining energy input to the weld process, and adjusting at least one of the force applied and the rotary speed of the first component based on the determined input energy, wherein determining energy input to the weld process takes place before upset has begun to develop.

Adjusting at least one of the force applied and the rotary speed of the first component based on the determined input energy may also take place before upset has begun to develop.

Determining energy input to the weld may comprise measuring rotary speed of the first component and calculating energy input based on reduction in rotary speed from an initial value.

Determining energy input to the weld may take place at a predetermined time which may be approximately 50% of the conditioning time for the weld.

BRIEF DESCRIPTION OF DRAWINGS

For a better understanding of the present invention, and to show more clearly how it may be carried into effect, reference will now be made, by way of example to the following drawings, in which.

DETAILED DESCRIPTION OF EMBODIMENTS

Figure 1:
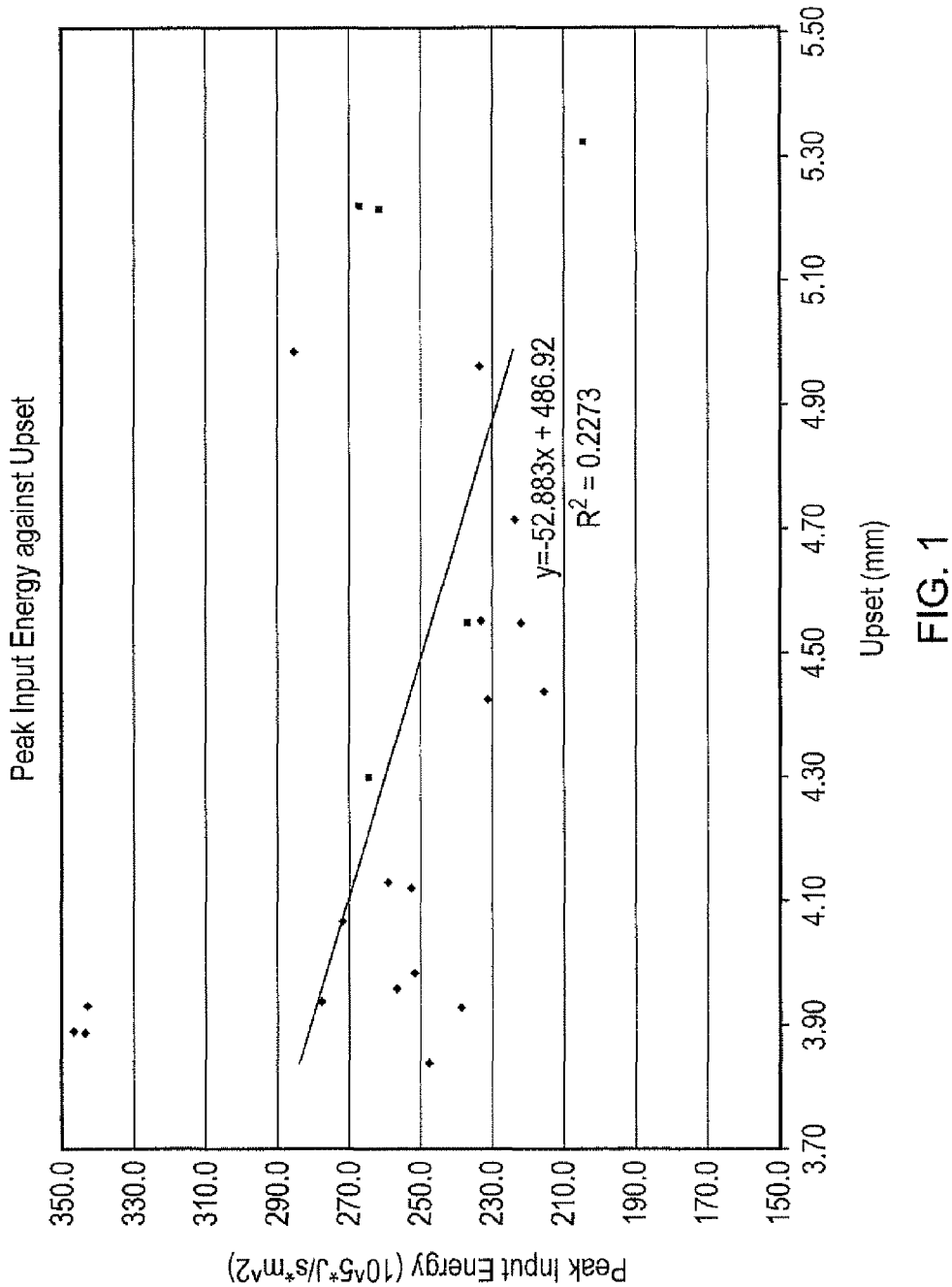
FIG. 1 is a graph illustrating energy input to a conventional friction welding process against upset length.
Figure 2:
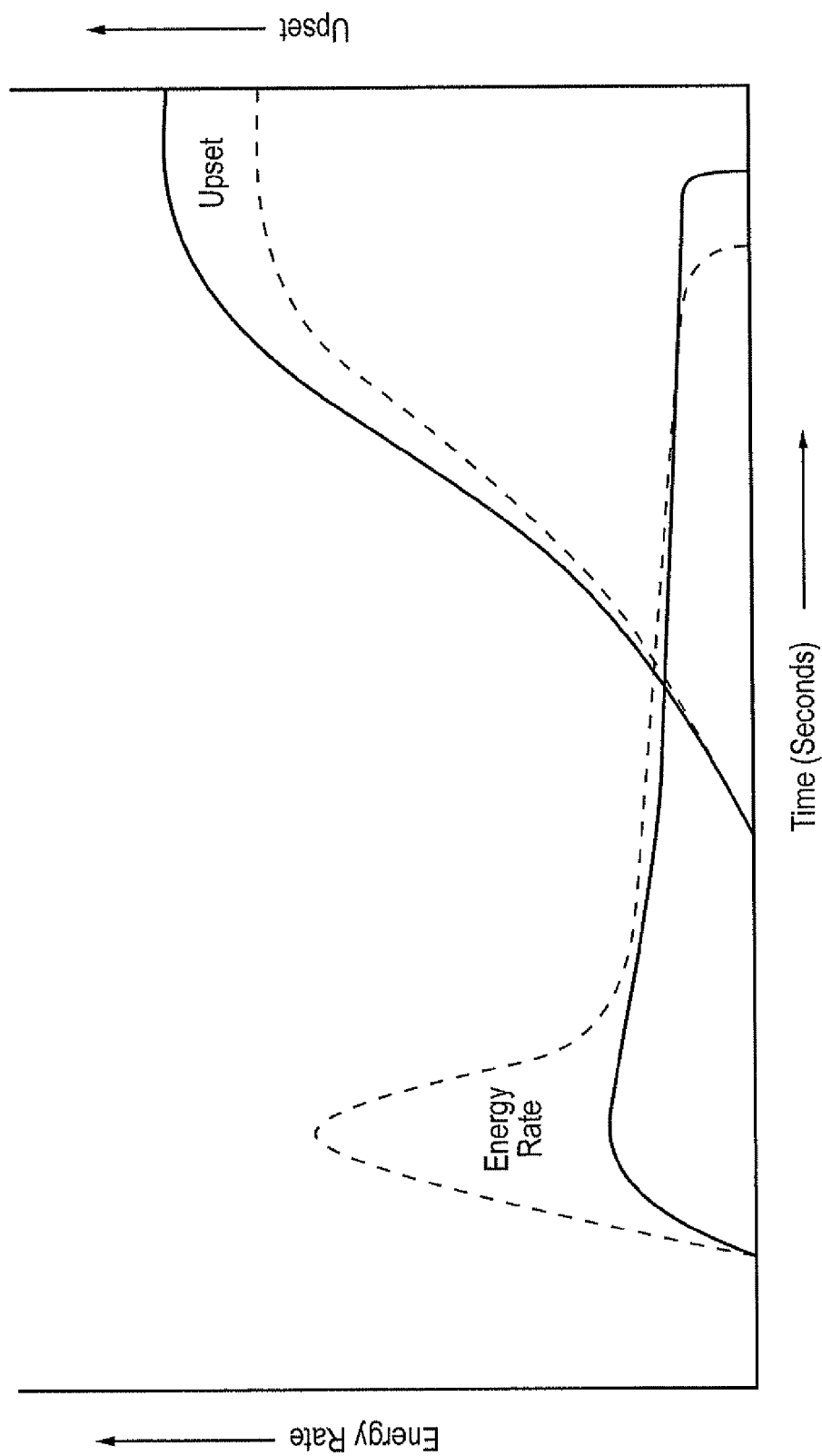
FIG. 2 is a graph illustrating energy rate and upset over time for two welding processes having the same geometry and material.

The inventors of the presently described method have discovered that overall upset length of a friction weld can be closely correlated to the initial energy input to the weld process. FIG. 2 illustrates upset development in welds having high and low upset length, together with the corresponding energy rate curves for the two welds. The graph illustrates how high and low upset lengths can be detected at a very early stage, before the upset has even started to develop.

The solid curves show a higher than average upset weld. The energy rate curve for this high upset weld can be seen to be relatively consistent during initial stages of the weld. In contrast, the dashed curves show a weld formed using the same geometry and input weld parameters in which the final upset was lower than average. The energy rate curve for this low upset weld can be seen to display a pronounced peak in the early stages of the weld process. After this initial early stage peak, the energy rate curve follows a similar path to that of the high upset energy rate curve.

The inventors of the present application have thus appreciated that initial energy input to a weld process is closely related to the eventual upset length. By monitoring energy rate at this early stage, and correcting for deviations from a constructed "target" curve, the method of the present invention provides greatly improved upset control. Correcting for deviations from a target curve involves adjusting one or more input parameters to the weld process, which may include the speed of rotation of one of the components or the force applied to bring the components together.

Details of the invention will now be described with reference to a friction welding apparatus schematically represented in FIG. 3.

Figure 3:
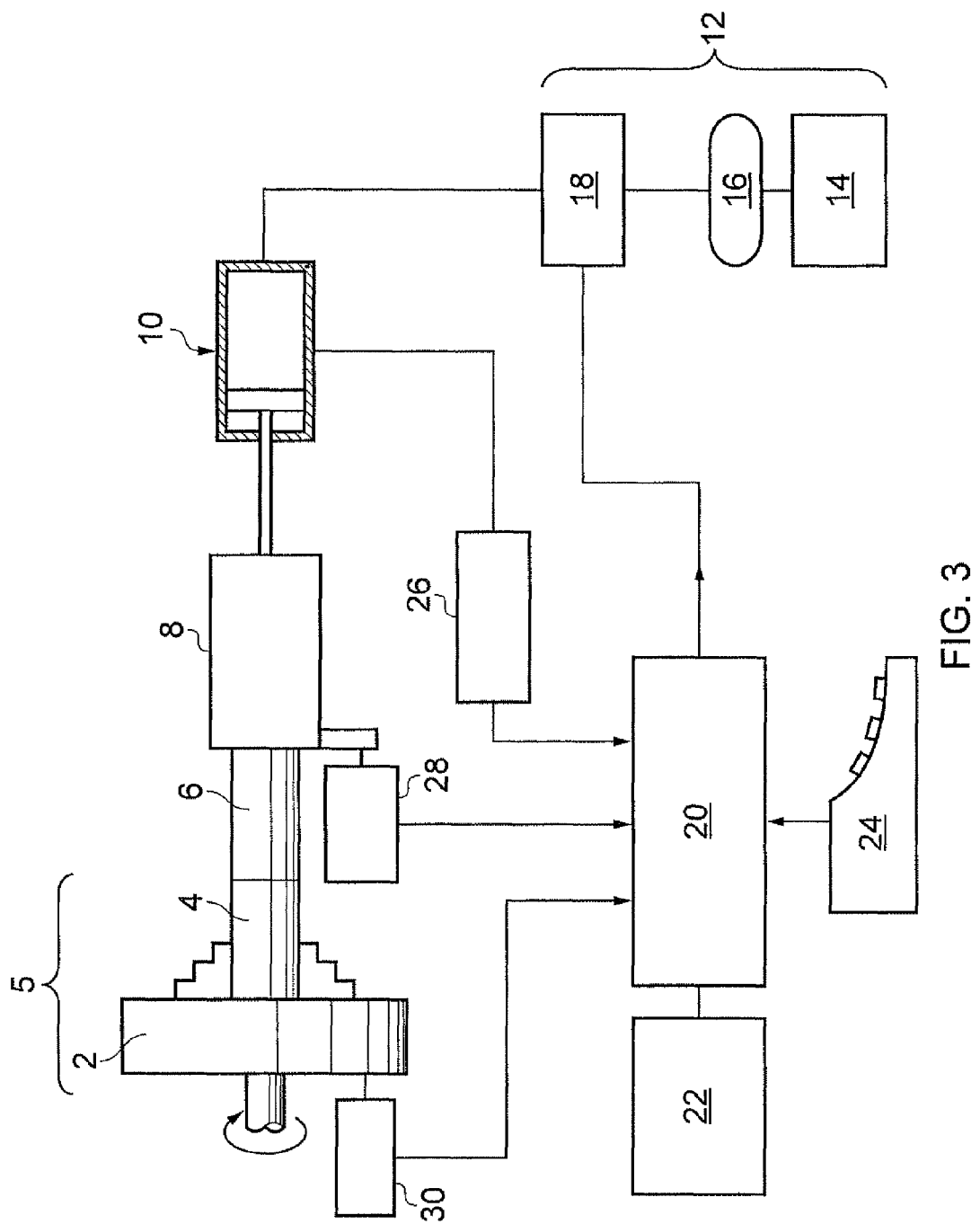
FIG. 3 is a schematic representation of apparatus for performing a friction weld.

With reference to FIG. 3, apparatus for performing a friction welding process comprises a chuck 2 which is driven by a flywheel and supports a first component 4 for rotation therewith. The chuck 2, flywheel and first component 4 together form a rotating assembly 5. A second component 6 is mounted in a vice 8 which is moveable along an axis towards or away from the first component 4 under the action of a hydraulic ram mechanism 10. The hydraulic ram mechanism 10 is connected to a fluid pressure system 12 consisting of an oil supply 14, a pump 16 and a servo valve 18. A microprocessor 20 having a memory 22 and a console 24 is connected to the servo valve 18 of the fluid pressure system 12 to control the fluid pressure in the hydraulic ram mechanism 10. The microprocessor 20 receives signals from a pressure transducer 26, which is in communication with the hydraulic ram mechanism 10, in order to monitor the pressure in the hydraulic ram mechanism 10. The microprocessor also receives signals from a linear transducer 28 and a tachometer 30. The linear transducer 28 is connected to the vice 8 and measures linear movement of the vice 8, and hence the second component 6, towards the first component 4. The tachometer 30 measures the speed of rotation of the chuck 2 and hence of the first component 4.

Operation of the apparatus in accordance with the method of the present invention is described below.

Initially, the first and second components 4, 6 are mounted in their respective housings on the chuck 2 and vice 8. The chuck 2 is driven via the flywheel to a desired speed of rotation $RPM_{t=0}$ that nominally provides the total energy per unit area required to complete the welding process. The energy per unit area provided by the rotating flywheel/chuck/component assembly 5 can be calculated from the following equation:

$$\frac{E}{A} = \frac{rpm^2 \times I}{constant \cdot A}$$

Where E=energy, I=inertia of the rotating assembly, A=contact area.

Once the desired speed $RPM_{t=0}$ has been reached, rotary drive is ceased.

The first and second components 4, 6 are then brought together at time t=0 by the application of pressure from the hydraulic ram mechanism 10. The pressure applied is a function of the load in the hydraulic ram mechanism 10 and the cross-section of the part being welded i.e. L/A (where L=load). At this time, the unit energy in the rotating assembly $(E/A)_{t=0}$.

The microprocessor 20 records in the memory 22 a reading from the linear transducer 28 that represents the contact position of the two components at time t=0.

The microprocessor also receives a signal from the tachometer 30 indicating the RPM at part contact time t=0 and calculates the corresponding initial unit energy $(E/A)_{initial}$ or $(E/A)_{t=0}$. This initial unit energy value is also stored in the memory 22.

As the pressure applied to the contacting components increases, the rotational speed of the rotating assembly 5 reduces, and heat is input to the weld area, A, through friction. Energy is lost from the flywheel/chuck/first component assembly 5 to the entire system including for example the parts being welded, heat, noise and tooling.

At a predetermined time (t=x) the microprocessor 20 reads the RPM of the flywheel/chuck/component assembly 5 from the tachometer 30, and energy so far lost by the rotating assembly 5 is calculated as a function of change in RPM from $RPM_{t=0}$ to $RPM_{t=x}$.

The predetermined time at which RPM is measured and energy lost calculated is approximately 50% of the conditioning time for the weld. Conditioning time is the time taken for the weld to progress sufficiently for upset to begin to develop. Conditioning time is empirically determined for a given material, geometry combination and parameter set. For example, for a nickel super alloy, conditioning time varies according to the alloy, geometry and parameters and is of the order of several seconds, for example approximately 5 seconds.

The microprocessor 20 uses the measured RPM value at t=x to calculate the energy remaining in the rotating assembly at time t=x $(E/A)_{t=x}$ The energy consumed thus far during the weld cycle is then determined by subtraction of $(E/A)_{t=x}$ from $(E/A)_{t=0}$.

The target value for E/A at the predetermined time in the weld is compared to the dynamically machine determined $(E/A)_{t=x}$. The target weld value for E/A is derived from a lookup table populated with empirically determined data for a given material and geometry combination. The target value read from the lookup table is an indicator of the E/A required to achieve the desired upset at the end of the weld (when RPM=0).

The difference between $(E/A)_{t=x}$ and the target weld value for E/A at t=x indicates the nature and magnitude of any adjustment required in pressure applied to the components in order to achieve the desired upset at the end of the weld cycle.

The load applied by the hydraulic ram mechanism 10, and hence the pressure applied to the components, is increased or decreased if the machine determined falls outside of predetermined acceptable limits bounding the target value of E/A. The necessary adjustment, in the form of a change in the load value, is determined using a look up table of E/A against L/A for a given material and geometry combination. The table is populated with empirically obtained data and broadly dictates an increase in load value if E/A is low and a decrease in load value if E/A is high.

Figure 4:
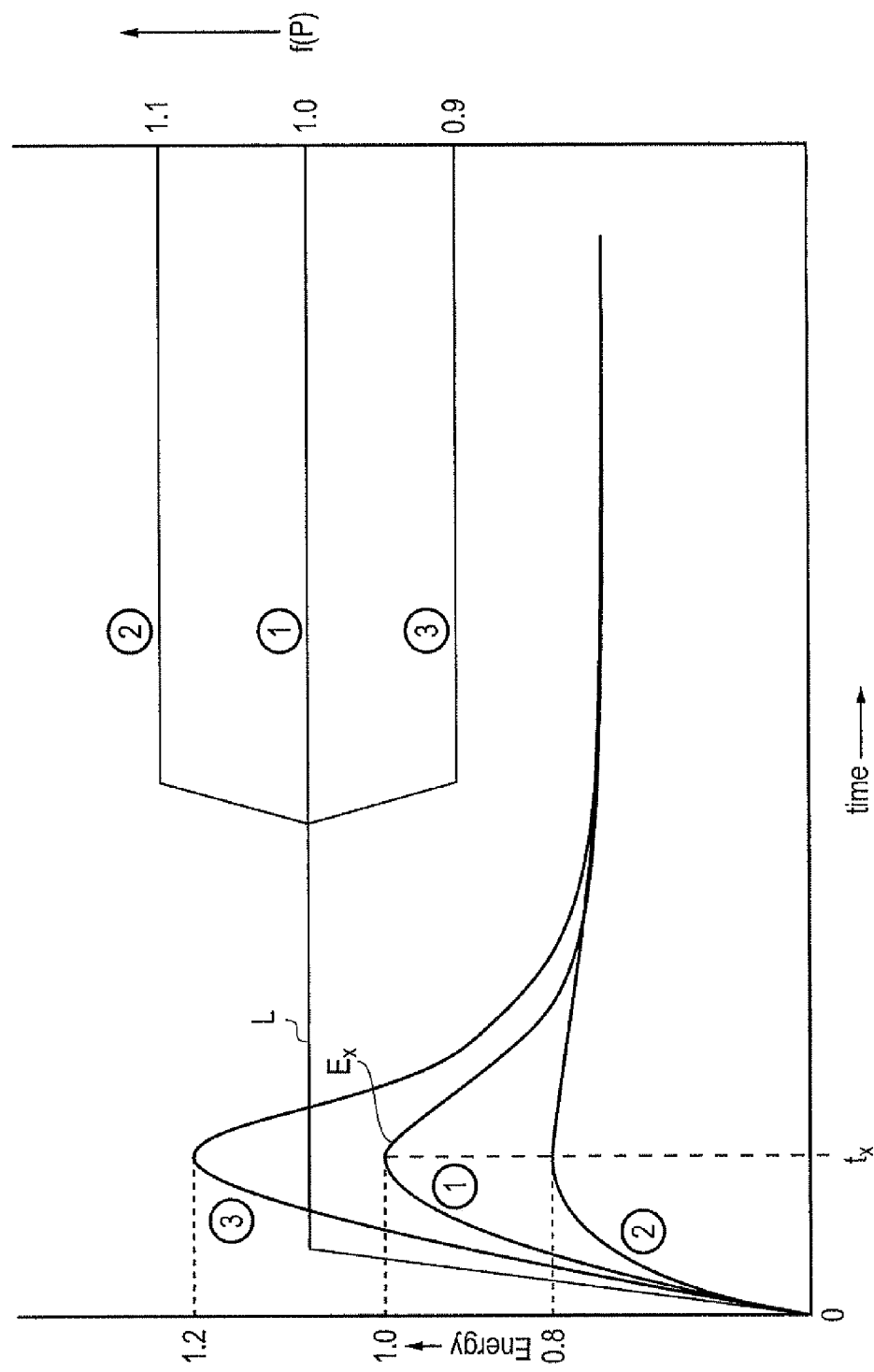
FIG. 4 is a graph illustrating energy input rates and force adjustment according to the present invention.

This adjustment is illustrated graphically in FIG. 4. FIG. 4 shows three energy rate curves: a target energy rate curve 1, demonstrating a small initial energy rate peak, a high upset energy rate curve 2, demonstrating substantially no initial peak, and a low upset energy rate curve 3, demonstrating a large initial peak. The target energy rate curve provides an energy threshold value $E_x$ for the desired energy value at the predetermined measuring time t=x. Applied load L is indicated on the right hand scale of FIG. 4. The applied load L is initially the same for all three energy rate curves, increasing from zero to a nominal constant value. The applied load L is then adjusted according to the difference between the measured value of E at time t=x and the threshold value $E_x$, which represents the target value for this time. In the case of curve 2, the load L is increased, in the case of curve 3, the load L is decreased, and if the energy rate curve matches the target curve 1, the applied load L is maintained at the constant value.

The adjusted pressure is then maintained for the remainder of the welding process, increasing the probability of achieving a weld with the desired upset.

It will be appreciated that the present invention thus provides improved control over upset length in rotary friction welding and other nominally constant energy processes. This improved control allows tighter tolerances to be placed on upset length, broadening the application of such processes to include space limited applications, and additionally minimising necessary downstream finishing operations and associated parasitic weight.

The invention claimed is:

1. A method of controlling a friction welding process in which a component is moved relative to another component as the components are joined, such that at least one of the components experiences a reduction in magnitude in at least one dimension, the method comprising:

monitoring an energy per area input to the process before any upset has begun to take place, and comparing the energy per area input to the process before any upset has begun to take place with a predetermined target value, and adjusting an input parameter for the process based on the comparison to control the reduction in magnitude in the at least one dimension, wherein the input parameter includes an input pressure to bring the components into contact, the input pressure being initially set at a constant value and subsequently adjusted to a predetermined value before the reduction, such that the adjusted pressure is maintained at the predetermined value until the process is completed.

2. The method of claim 1, wherein monitoring the energy per area input includes taking discrete measurements over a predetermined period of time.

3. The method of claim 1, wherein monitoring the energy per area input includes taking a single measurement at a predetermined time.

4. The method of claim 3, wherein the predetermined time is half a time take for upset to commence.

5. The method of claim 1, wherein the predetermined target value is determined from a look up table.

6. The method of claim 1, wherein adjusting an input parameter includes determining a desired adjustment from a look up table that correlates measured energy per area input values with corresponding input parameter values.

7. The method of claim 6, wherein the look up table is populated with empirically determined data.

8. The method of claim 1, wherein the input parameter includes a rotational speed.

9. The process of claim 1, further comprising:
adjusting a rotary speed of at least one of the components based on the determined energy per area input before the upset has begun to develop.

10. The process of claim 1, further comprising:
determining the energy per area input to the weld by measuring a rotary speed of at least one of the components and calculating the energy per area input based on a reduction in the rotary speed from an initial value.

11. The method of claim 1, wherein monitoring the energy per area input to the process includes monitoring a parameter and calculating the energy per area input to the process as a function of the monitored parameter.

12. The method of claim 11, wherein the monitored parameter includes at least one of rotational speed and input pressure.

\* \* \* \* \*